United States Patent [19]
Kanao

[11] Patent Number: 5,478,123
[45] Date of Patent: Dec. 26, 1995

[54] CORRUGATED SPIRAL PIPE JOINT, CORRUGATED SPIRAL PIPE PROVIDED WITH THE JOINT, PRODUCING METHOD THEREFOR, AND METHOD OF CONNECTING A CORRUGATED SPIRAL PIPE TO THE CORRUGATED SPIRAL PIPE

[76] Inventor: Shiro Kanao, 9-18, Nanpeidai 4-chome, Takatsuki-shi, Osaka, Japan

[21] Appl. No.: 332,807

[22] Filed: Nov. 2, 1994

[30] Foreign Application Priority Data

Nov. 2, 1993 [JP] Japan ................................. 5-297477

[51] Int. Cl.⁶ ....................................................... F16L 13/11
[52] U.S. Cl. .......................... 285/289; 285/297; 285/903; 285/294; 285/295
[58] Field of Search ................................ 285/903, 284, 285/289, 290, 294, 295, 296, 297, 21

[56] References Cited

U.S. PATENT DOCUMENTS

| | | | |
|---|---|---|---|
| 245,263 | 8/1881 | Robb | 285/290 |
| 526,097 | 9/1894 | Anderson | 285/290 |
| 836,173 | 11/1906 | Barnstead | 285/289 |
| 3,606,401 | 9/1971 | Schwarz | 285/294 |
| 3,916,502 | 11/1975 | Bagnulo | 285/294 |
| 4,226,444 | 10/1980 | Bunyan | 285/294 |
| 5,415,440 | 5/1995 | Kanao | 285/903 |

FOREIGN PATENT DOCUMENTS

| | | | |
|---|---|---|---|
| 1391945 | 2/1965 | France | 285/290 |
| 668010 | 9/1964 | Italy | 285/289 |
| 5309 | of 1896 | United Kingdom | 285/290 |
| 4066 | of 1898 | United Kingdom | 285/290 |

*Primary Examiner*—Eric K. Nicholson
*Attorney, Agent, or Firm*—Sughrue, Mion, Zinn, Macpeak & Seas

[57] ABSTRACT

A pipe joint for connecting a corrugated spiral pipe includes an annular projection formed on the axially central portion, a spiral projection bonded on a portion on one side of this projection so as to engage with the spiral pipe, compressible and transformable ring-like sealing bodies bonded on the inner circumferential surfaces on the both sides of the spiral projection, and a small hole for injecting a hardening liquid agent and formed in a portion between the sealing bodies so as to penetrate the portion. A corrugated spiral pipe provided with a joint has the above mentioned joint fitted onto a pipe end of the spiral pipe, and is produced by filling a space portion between the ring-like sealing bodies with a hardened matter of a hardening liquid agent, so that the joint is water-tightly coupled with the pipe end of the spiral pipe. Further, in a method of connecting another spiral pipe with such a corrugated spiral pipe provided with such a joint, a block-like water sealing material is pressed into a valley portion of a pipe end of another spiral pipe, an elastic seal ring having a plurality of annular corrugations on the outer circumferential surface is fitted onto the upper surface of the water sealing material, and thereafter the pipe end is pressed into a tip end projecting portion of the joint body.

11 Claims, 7 Drawing Sheets

CORRUGATED SPIRAL PIPE JOINT, CORRUGATED SPIRAL PIPE PROVIDED WITH THE JOINT, PRODUCING METHOD THEREFOR, AND METHOD OF CONNECTING A CORRUGATED SPIRAL PIPE TO THE CORRUGATED SPIRAL PIPE

BACKGROUND OF THE INVENTION

The present invention relates to a joint attached to a corrugated spiral pipe, a corrugated spiral pipe provided with the joint, a method of producing such a corrugated spiral pipe, and a method of connecting this corrugated spiral pipe provided with the joint to another corrugated spiral pipe to which no joint is attached.

Conventionally, when corrugated spiral pipes are connected to each other, the pipe ends of the spiral pipes to be connected to each other are inserted from both sides of a pipe joint oppositely to each other respectively at the place where the pipes are used. A sealing means is given to each of the spiral pipes before or after this insertion so that the spiral pipes are connected to each other.

Therefore, since such conventional corrugated spiral pipes are necessary to be connected in unsuitable plumbing places by unskilled workers who are not specialists, dependently on temperature or weather, there has been a problem that it takes much time and labor to dispose the pipes, and the working of plumbing cannot be performed rapidly. In addition, in a conventional working of plumbing, there has been a problem that a pipe joint must be prepared at every connecting point separately from spiral pipes to be connected, and the pipe joint must be carried in addition to the spiral pipes.

SUMMARY OF THE INVENTION

Therefore, in order to solve such problems belonging to the conventional spiral pipes, the present invention is intended to provide a pipe joint suitable to be attached to a pipe end of a spiral pipe, a spiral pipe provided with the joint which has been attached at an end of the pipe in a factory or the like by a skilled worker independently of weather and so on, and means for attaching such a joint to a pipe end of a spiral pipe to thereby prepare pipes provided with joints so that such pipes provided with joints can be connected to each other in a plumbing place easily and rapidly, further to provide means by which this working of connection can be made rapidly. Thus, the present invention provides a series of techniques by which the working of plumbing can be performed rapidly and accurately.

The pipe joint according to the present invention for connecting a synthetic resin corrugated spiral pipe having an outer surface formed into a spirally corrugated shape, comprises: an inner circumferential surface which is cylindrical and larger than the outer circumferential diameter of a peak portion of the spiral pipe to be connected; an annular projection which is formed at a portion near the center in the axial direction of the joint so as to project in the inner circumferential direction; a base portion which is located on one side of the annular projection and constituted by a first cylindrical portion, a spiral projection engageable with the spiral corrugation of the connected corrugated pipe, and a second cylindrical portion; ring-like sealing bodies which are formed of compressible and transformable materials and bonded on the inner circumferential surfaces of the first and second cylindrical portions respectively; and a small hole for injection of a hardening liquid agent, which is formed in a portion between the sealing bodies so as to penetrate the portion.

The corrugated spiral pipe provided with a joint is configured such that the joint having the structure as mentioned above is coupled with a synthetic resin corrugated spiral pipe having an outer circumferential surface formed into a spirally corrugated shape. A pipe end of the spiral pipe is inserted into the base portion (1B) of the joint. A space portion surrounded by an outer circumferential surface of the pipe end, the inner circumferential surface of the base portion of the joint, and the ring-like sealing bodies is filled with a hardened matter of the hardening liquid agent so that the joint is water-tightly coupled with the pipe end of the spiral pipe.

The method to obtain such a corrugated spiral pipe provided with such a joint is configured such that the pipe end of the synthetic resin corrugated spiral pipe having an outer circumferential surface formed into a spirally corrugated shape is inserted into the base portion of the joint having the above described structure while the spiral corrugation of the spiral pipe is engaged with the spiral projection of the joint, then the hardening liquid agent is injected through the hardening liquid agent injection small hole into the space portion surrounded by the outer circumferential surface of the pipe end, the inner circumferential surface of the base portion of the joint, and the ring-like sealing bodies so that the space portion is filled with a hardened matter of the hardening liquid agent to thereby make the joint be water-tightly coupled with the pipe end of the spiral pipe.

Furthermore, the method to connect another spiral pipe with the above-mentioned corrugated spiral pipe provided with the joint is configured such that, when another corrugated spiral pipe is connected with this corrugated spiral pipe provided with the joint, a block-like water sealing material having a sectional shape a little larger than the sectional shape of a valley portion of a pipe end portion of the corrugated spiral pipe to be connected is pressed into the valley portion, then an elastic seal ring having a plurality of annular corrugations formed on its outer circumferential surface is fitted onto the outer circumferential surface of the pipe end of the spiral pipe, and thereafter the pipe end is pressed into a tip end projecting portion of the joint body to thereby complete the connection.

Although the material of the joint according to the present invention is not limited specially, it is preferable to use a hard and thermoplastic synthetic resin material such as hard polyethylene, hard polyvinyl chloride, which is suitable to blow molding and hard a self-shape-maintaining property after molding. As for the ring-like compressible and transformable sealing bodies to be bonded to the inner surface of the joint, comparatively soft materials such as rubber or soft synthetic resin, or foamed bodies are preferable in the point that it is easy to be compressed and transformed and it is easy to be fitted to the spiral pipe. The sectional shape thereof is preferably like a flat belt or a square belt in the point that it has a large surface to be bonded so that it is easy to be bonded to the inner surface of the joint. Further, if the sealing body having one surface (surface to be bonded) coated with a bonding agent in advance is used, it can be conveniently put on the inner surface of the joint and fixed thereto.

The joint according to the present invention having such a structure as described above can be coupled with the spiral pipe by use of the spiral projection formed in the base portion of the spiral pipe. Accordingly, there is an advantage that the pipe can be inserted and fitted into the joint to a predetermined position accurately regardless of the presence of the sealing bodies. In addition, by using such a joint, the corrugated spiral pipe provided with the joint can be watertightly produced in a factory or the like, independently of weather, by a skilled special worker sequentially, continuously and accurately, and the produced spiral pipe can be carried in a state that the pipe is always accompanied with the joint. Accordingly, there is an advantage that it is not necessary to carry the joint separately, and it is possible to start the working of connection with another spiral pipe at a plumbing place immediately. In that case, since the pipe joint is always fixed to the pipe end of the spiral pipe, there is an advantage that it is possible to perform the connection to another spiral pipe immediately.

In addition, in the method of producing a corrugated spiral pipe provided with a joint according to the present invention, the joint can be extremely easily inserted and fitted to the pipe end of the spiral pipe by use of the spiral projection formed in the joint as mentioned above, and can be watertightly attached extremely certainly by the injection of a hardening liquid agent. In addition, there is an advantage that it is possible to perform connection with another pipe at a plumbing place extremely easily and rapidly.

DETAILED DESCRIPTION OF THE PREFERRED EMBODIMENTS

Preferred embodiments of the present invention will now be described with reference to the drawings.

Figure 1:
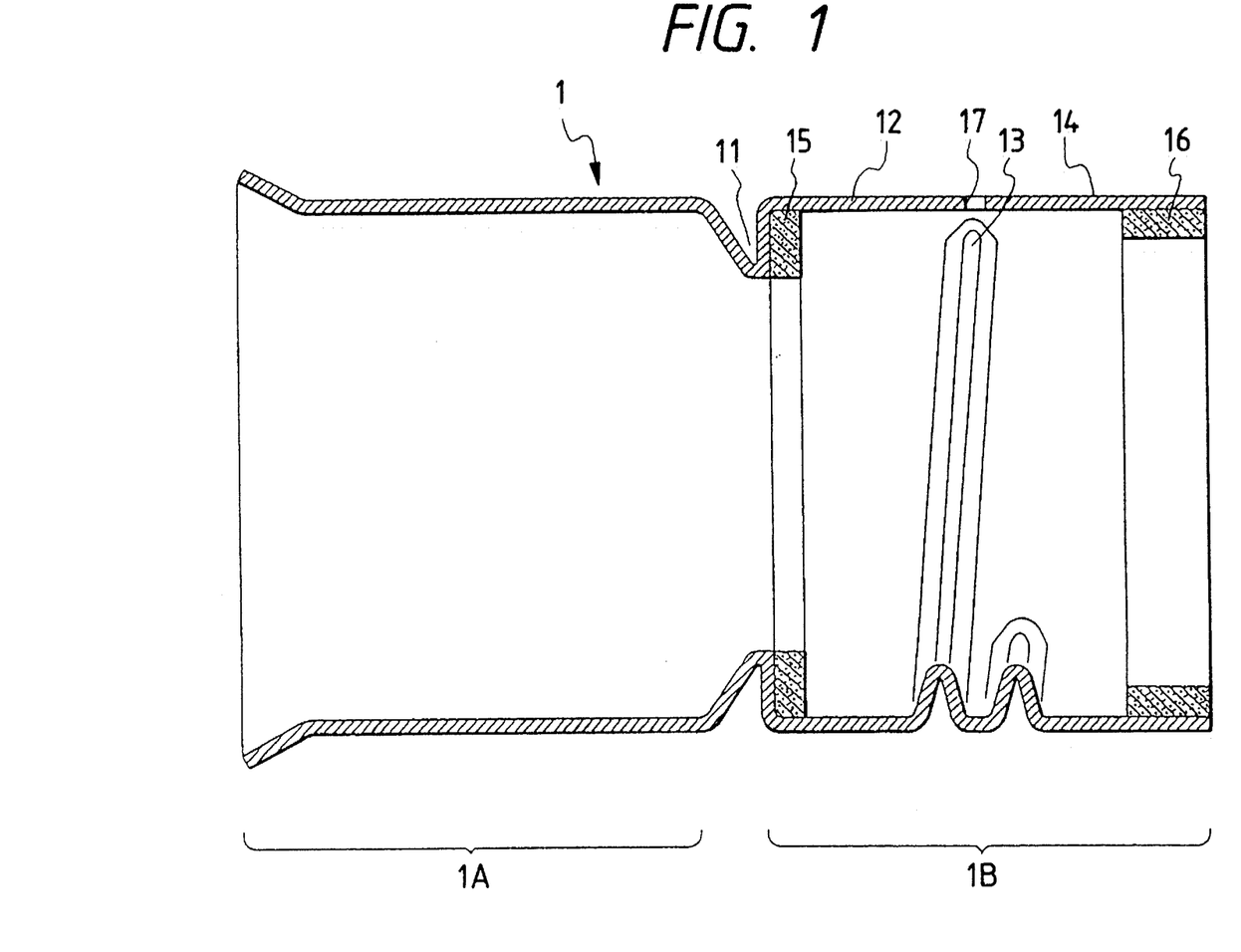
FIG. 1 is a sectional view cut away along a central longitudinal direction illustrating a first embodiment of the joint according to the present invention.

FIG. 1 is a sectional view cut away along a central longitudinal direction illustrating a first embodiment of a joint 1 according to the present invention. The body portion of the joint 1 is obtained by molding a thick tube of hard synthetic resin by a blow molding method. The configuration of the body portion of the joint 1 is cylindrical as a whole. Depending on the pipe diameter of a spiral pipe to be connected, the thickness of the body portion of the joint 1 is made to be about 2 to 10 mm, and the diameter of an inner circumferential surface 2 (FIG. 2) of the same is formed to be larger by 5 to 20 mm than the outer diameter of a peak portion (c) of a spiral pipe (A) to be connected. In an approximately central portion of the joint in the axial direction, an annular projection 11 having a deformed V-shaped section is formed so as to project into the inner circumferential direction as illustrated. Almost the whole of a tip end projecting portion 1A disposed on one side (on the left side in the drawing) of this annular projection 11 is formed into a flat cylinder, and its outer end portion is made open like a trumpet. A base portion 1B disposed on the other side (on the right side in the drawing) is constituted by a first cylindrical portion 12 having a flat and cylindrical shape, a spiral projection 13 having a length of almost one circle and having a V-shaped section for engaging with the spiral corrugation of the spiral pipe (A) to be connected, and a second cylindrical portion 14 having a flat and cylindrical configuration. On the inner circumferential surfaces of these first and second cylindrical portions 12 and 14, sealing bodies 15 and 16 are bonded in a ring-like configuration after a separation paper temporarily pasted thereon is separated. In each of the sealing bodies, a foamed body made of soft synthetic resin and cut off into a flat belt-shape is coated with a pressure sensitive bonding agent on its back surface and temporarily covered with the separation paper thereon. In this embodiment, the sealing body 15 is bonded on the vertical surface on the base portion 1B side of the annular projection 11 so as to be along the vertical surface and to have almost the same diameter as the end surface on the inner circumference thereof. The inner circumferential diameter of the other sealing body 16 is made to have a diameter smaller than the outer circumferential diameter of the peak portion (c) of the spiral pipe (A) to be connected. The spiral projection 13 having a V-shaped section formed in a portion between these sealing bodies 15 and 16 is discontinued in the upper portion in the drawing. In this discontinued portion, that is, in the portion where the projection 13 is not formed, a (or a plurality of) small hole 17 for injecting a hardening liquid agent is formed so as to penetrate the portion.

Figure 2:
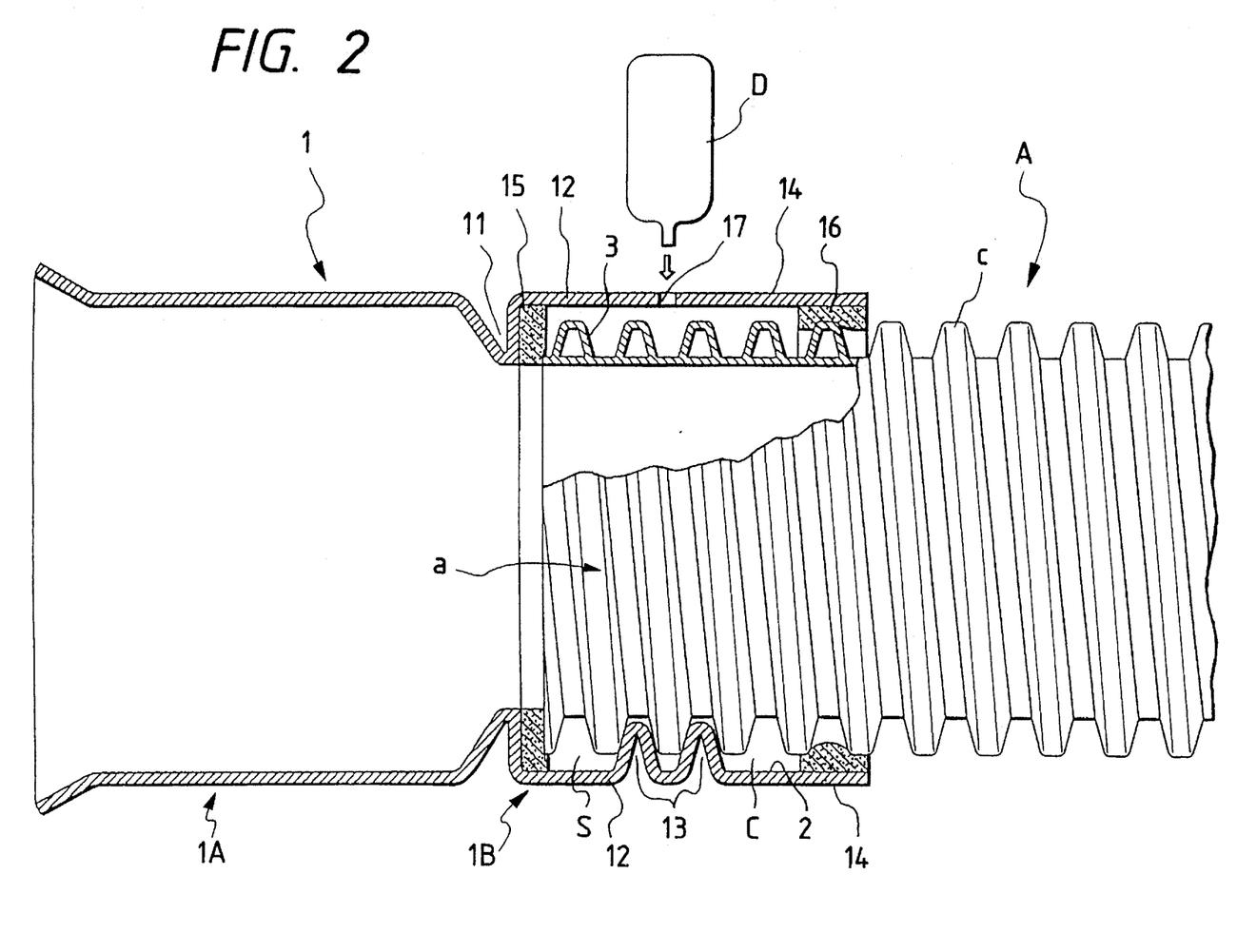
FIG. 2 is a sectional view cut away partially along a central longitudinal direction showing a spiral pipe coupled with the joint of FIG. 1.

Next, an embodiment of a method of producing a spiral pipe provided with a joint by using the joint 1 having such a structure as mentioned above will be described. FIG. 2 is a diagram illustrating the embodiment and showing the state where the joint 1 and the spiral pipe (A) are connected to each other. The corrugated spiral pipe (A) is a pipe which is made of hard synthetic resin and which has an outer surface formed into spirally corrugated shape. Since such a spiral pipe provided with a joint is the coupling of the spiral pipe (A) and the joint 1, the production method of such a spiral pipe with a joint can be described based on either of them as a subjective one. Hence, in this case, the embodiment will be described about a case where the joint 1 is attached to the spiral pipe (A).

First, the joint 1 is pressed and fitted onto a pipe end (a) of the corrugated spiral pipe (A) so as to get over the ring-like sealing body 16 from the tip end open portion at the right end in the drawing. When the spiral corrugation of the spiral pipe (A) contacts with the spiral projection 13 of the joint 1, the joint 1 is rotated so as to be inserted more deeply while making the corrugation of the spiral pipe (A) and the projection 13 engaged with each other, until the tip end surface of the spiral pipe (A) contacts with and presses the sealing body 15 bonded to the surface on the base portion 1B side of the annular projection 11 of the joint 1. Thereafter, a liquid urethane resin foaming agent (D) serving as a hardening liquid agent is injected, through the hardening liquid agent injecting small hole 17 which is made to come onto the upper surface, into a space portion (S) surrounded by an outer circumferential surface 3 of the pipe end (a) of the spiral pipe (A), the inner circumferential surface 2 of the base portion 1B of the joint 1, and the two ring-like sealing bodies 15 and 16. The is structure is left as it is for a predetermined time, and the foaming agent (D) is foamed so that the space portion (S) is filled with an urethane foamed and hardened body (C) to thereby couple the joint 1 in a water-tightened state onto the pipe end (a) of the spiral pipe (A).

Thus, it is possible to obtain a spiral pipe provided with a joint in which the joint body 1 having an inner diameter larger than the outer circumferential diameter of the peak portion (c) of the spiral pipe (A) is coupled with the spiral pipe (A) in a condition that a part of the joint 1, that is, the tip end projecting portion 1A on the left side of the annular projection 11 is made to project outside the spiral pipe (A), while the rest part, that is, the base portion 1B on the right side of the annular projection 11 is fitted onto the pipe end (a) of the spiral pipe (A). In other words, it is possible to obtain a spiral pipe (A) provided with a joint having such a structure that the pipe end (a) of the spiral pipe (A) is inserted into the base portion 1B of the joint 1, and that the space portion (S) surrounded by the outer circumferential surface 3 of the pipe end (a), the inner circumferential surface 2 of the base portion (1B) of this joint 1, and the ring-like sealing bodies 15 and 16 is filled with a hardened matter of a hardening liquid agent, that is, with the urethane foamed and hardened body (C) of the liquid urethane resin foaming agent (D), so that the joint 1 is water-tightly coupled with the pipe end (a) of the spiral pipe (A).

Figure 3:
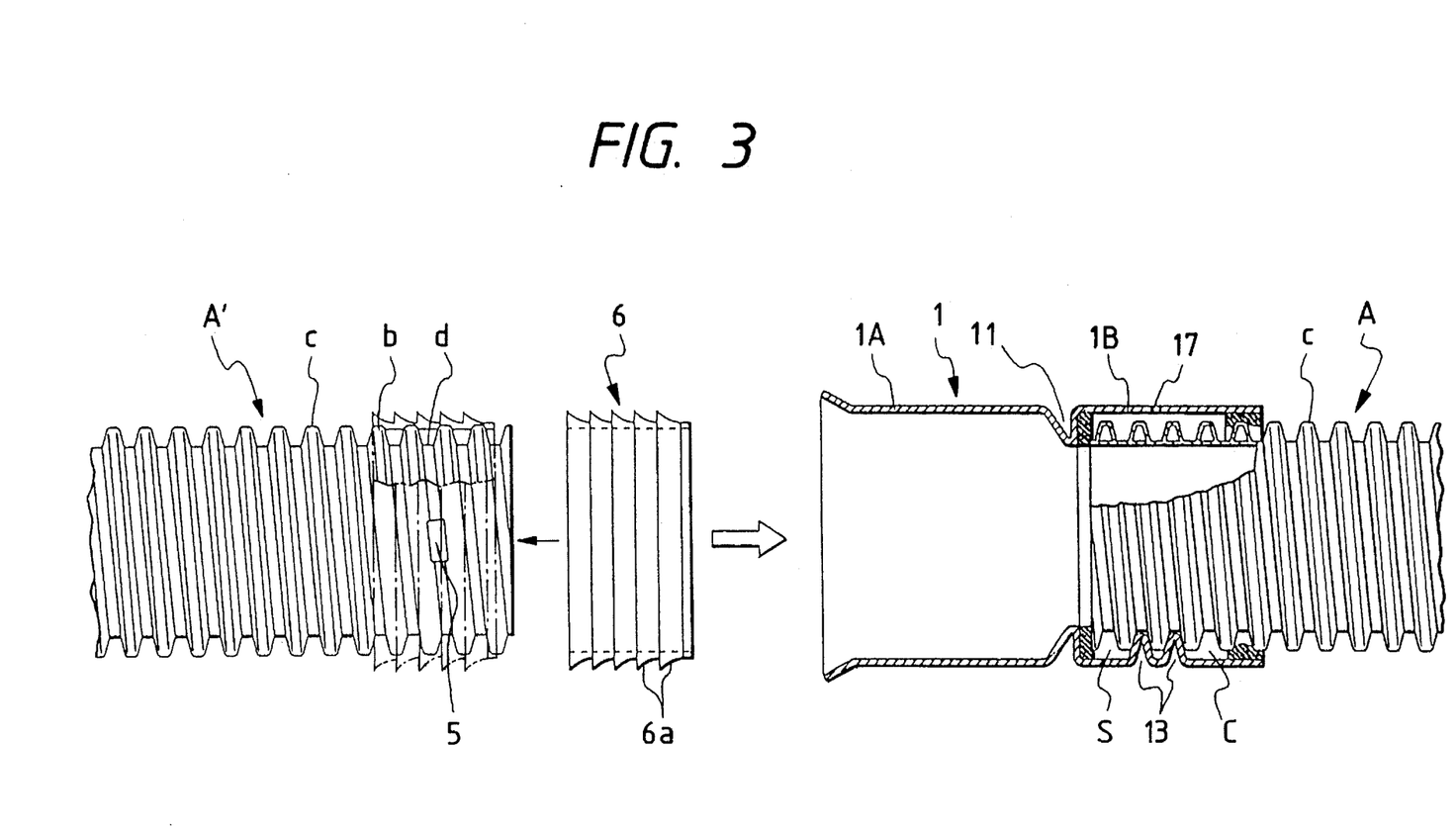
FIG. 3 is an explanatory diagram illustrating means for connecting another spiral pipe to the spiral pipe of FIG. 2.

Next, the method of connecting another corrugated spiral pipe (A') with the thus constructed spiral pipe (A) provided with the joint will be described. FIG. 3 is a diagram illustrating a state before connection, used for explaining this method. First, a water sealing material 5, for example, a block piece 5 made of butyl rubber is pressed into a valley portion (d) of a pipe end (b) of the corrugated spiral pipe (A') to be connected and shown in the left side of the drawing so as to fill the valley portion (d) perfectly, so that the upper surface thereof projects slightly outside the outer circumferential surface of the peak portion (c). The water sealing material 5 is formed into a block-shape and has a section a little largest than the section of the valley portion (d). Thereafter, an elastic seal ring 6, for example, an expansible elastic ring 6 made of rubber is fitted onto the outer circumferential surface of the pipe end (b) of the spiral pipe (A') so as to cover the upper surface of the water sealing material 5 as indicated by an imaginary line in the drawing. The elastic seal ring 6 is configured such that the inner surface thereof is smooth and a plurality of annular corrugations 6a are formed on the outer circumferential surface thereof. Then, the pipe end (b) covered with the elastic ring 6 is pressed into the tip end projecting portion 1A of the joint 1 in the spiral pipe (A) provided with a joint so that the end surface of the spiral pipe (A') contacts with the annular projection 11.

Thus, the connection between the spiral pipe (A') to be connected and the spiral pipe (A) provided with a joint is completed by pressing the spiral pipe (A') covered with the elastic seal ring 6 into the joint 1 of the spiral pipe (A) provided with a joint. The connected spiral pipe (A') can be connected to the spiral pipe (A) in a water-tightness state such that the elastic seal ring 6 water-seals the peak portion (c) and the block piece 5 water-seals the valley portion (d).

When connecting the spiral pipe (A') to the spiral pipe (A), if necessary, a bonding agent may be applied in advance between the spiral pipe (A') to be connected and the elastic seal ring 6 and further between the elastic seal ring 6 and the joint 1, so that the spiral pipe (A') and the joint 1 are bonded and fixed with each other to thereby prevent the spiral pipe (A') from moving in the direction of removal of the spiral pipe (A') from the joint 1.

Figure 4:
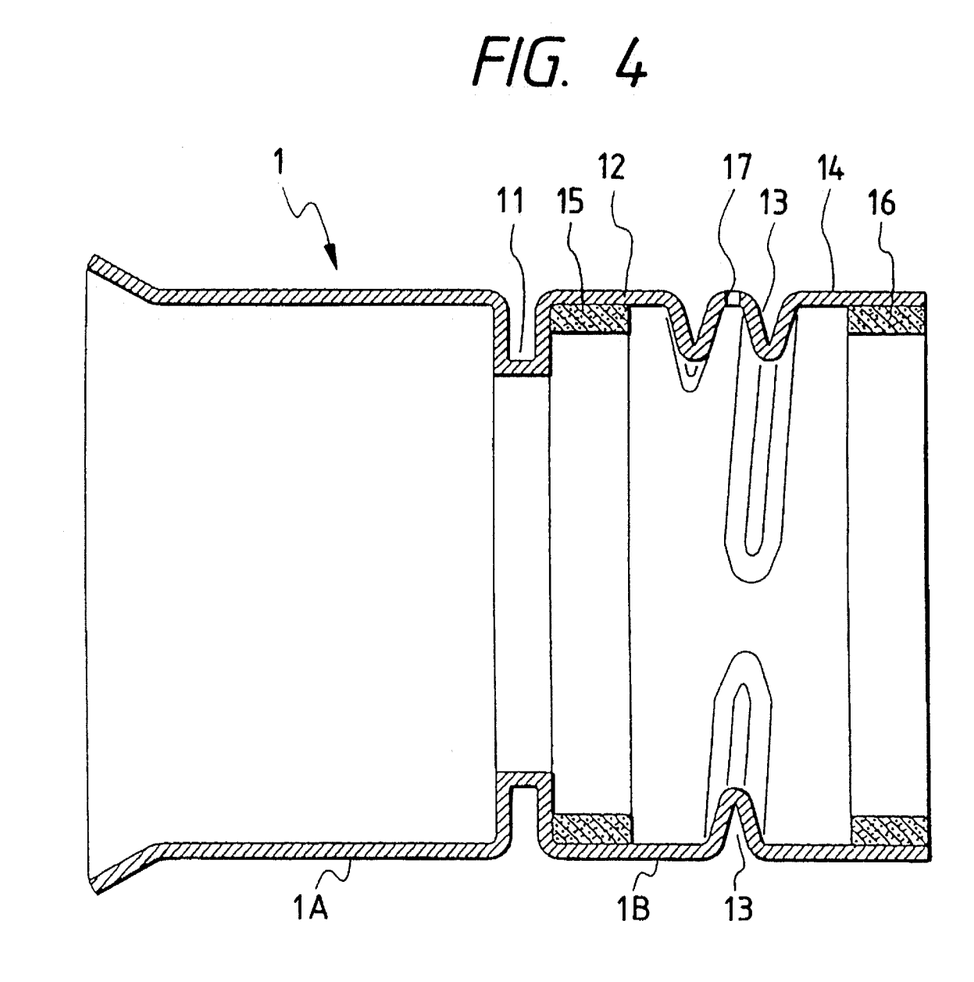
FIG. 4 is a sectional view cut away along a central longitudinal direction illustrating a second embodiment of the joint according to the present invention.
Figure 5:
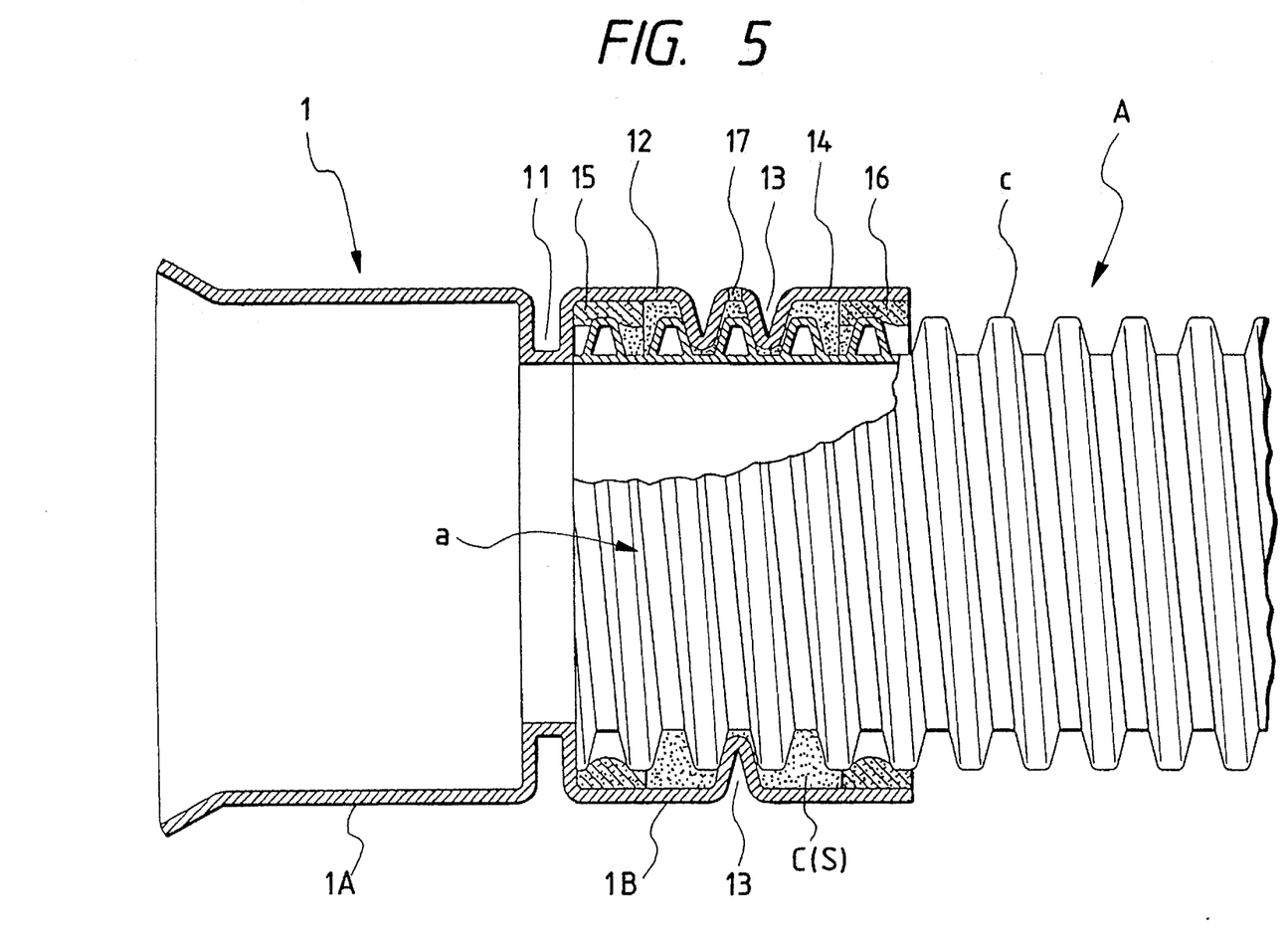
FIG. 5 is a sectional view cut away partially along a central longitudinal direction showing a spiral pipe coupled with the joint of FIG. 4.

FIGS. 4 and 5 show a second embodiment of a joint 1 and a spiral pipe (A) provided with the joint 1 attached thereto. As shown in FIG. 4, this joint 1 has such a structure that the shape of the annular projection 11 shown in the first embodiment is formed into a shape having a U-section open to the outside, that is, into such a shape that both the side walls of the annular projection in the axial direction are approximately perpendicular to the axial direction. In addition, the spiral projection 13 shown in the first embodiment is formed into partial projections 13 divided into three in the circumferential direction, and a small hole 17 is formed in a portion between one projection 13 and another projection 13 adjacent thereto. In addition, a sealing body 15 on the side of the annular projection 11 is bonded along the inner circumferential surface of the joint 1 in the same manner as the other sealing body 16. The other parts have the same structure as tpipe in the joint 1 of the first embodiment.

In coupling the joint 1 having such a structure with a pipe end (a) of a corrugated spiral pipe (A), the joint 1 is fitted onto the spiral pipe (A) while the joint 1 is rotated relative to the spiral pipe (A), and thereafter a liquid urethane resin foaming agent (D) is injected into a space portion (S) between the spiral pipe (A) and the joint 1 through a small pipe 17 formed in the joint 1, so as to fill the space portion (S) with an urethane resin foamed and hardened body (C). Then means for water-tightly coupling the joint 1 with the pipe end (a) of the spiral pipe (A) is carried out in the order which was described in the first embodiment, so that it is possible to obtain a spiral pipe provided with a joint as shown in FIG. 5.

Figure 6:
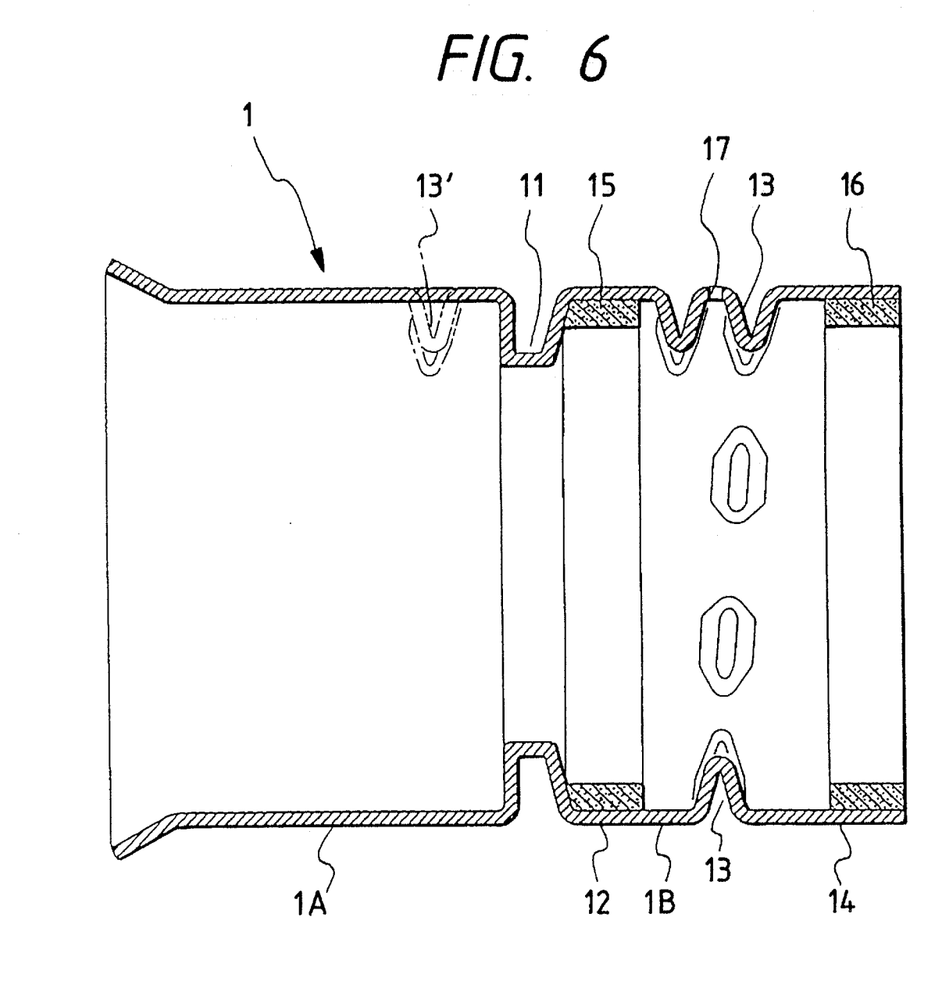
FIG. 6 is a sectional view cut away along a central longitudinal direction illustrating a third embodiment of the joint according to the present invention.
Figure 7:
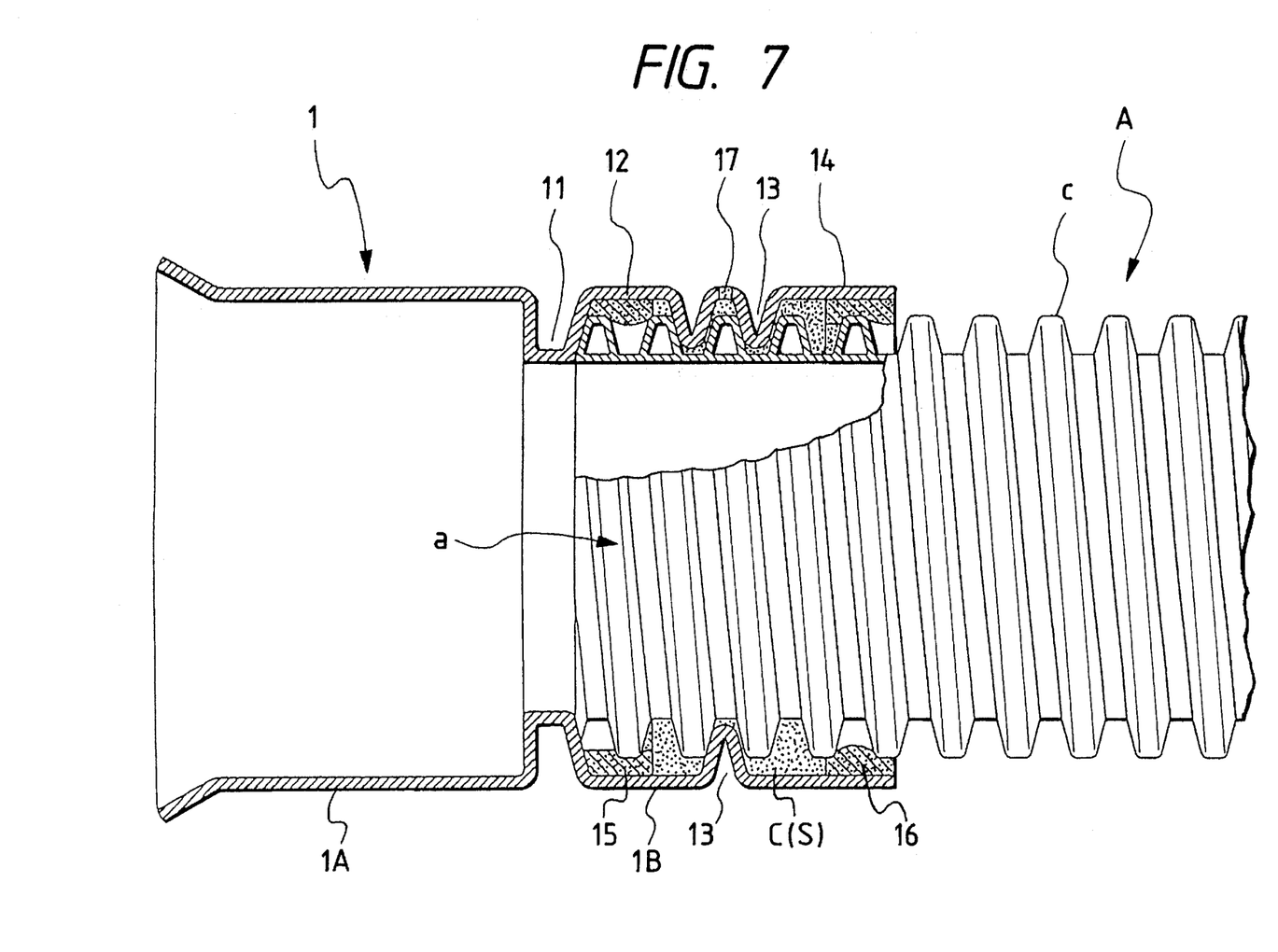
FIG. 7 is a sectional view cut away partially along a central longitudinal direction showing a spiral pipe coupled with the joint of FIG. 6.

FIGS. 6 and 7 show a third embodiment of a joint 1 and a spiral pipe (A) provided with the joint 1 attached thereto. As shown in FIG. 6, the joint 1 shown in this embodiment is formed so that the shape of the annular projection 11 shown in the first embodiment is formed into a shape having a deformed-V section with a bottom will, that is, into such a shape that the left side wall of which in the axial direction is approximately perpendicular to the axial direction, and the right side wall in the axial direction is inclined with an almost the same angle as that of the corrugation of the spiral pipe (A) so as to contact with the peak of the corrugation of the spiral pipe (A) as shown in the upper portion of FIG. 7. In addition, the spiral projection 13 shown in the first embodiment is formed into a number of small projections 13 in the spiral direction, instead of a continuous spiral projection. The other parts are the same as those in the second embodiment.

Means for coupling this joint 1 with the spiral pipe (A) is the same as the means which was described in the first embodiment. Accordingly, it is possible to obtain a spiral pipe with a joint as shown in FIG. 7.

In the joint 1 according to the present invention, as shown by the imaginary line in FIG. 6, a continuous or partial spiral projection 13' may be formed inside the tip end projecting portion 1A side of the joint 1 in the same manner as the spiral projection 13 shown in the respective embodiments so that the spiral projection 13' engages with the corrugation of the spiral pipe (A') to be connected. If the corrugation of the spiral pipe (A') and the spiral projection 13' are engaged thus, it is possible to prevent the spiral pipe (A') from being detached from the joint 1. Of course, in this case, preferably the water sealing material 5 and the seal ring 6 are attached to the other portion than the portion where the spiral pipe (A') and the projection 13' are engaged. In addition, in the joint 1, another sealing body like the sealing body 15 shown in the first embodiment may be bonded to the surface on the tip end projecting portion 1A side of the annular projection 11 which contacts with the tip end surface of the spiral pipe (A') to be connected.

Although the form of the joint 1 and the shape of the spiral pipe (A) are the similar type in the respective embodiments in order to facilitate understanding, the inner diameter of the joint 1 may be different between the side to be connected to the spiral pipe (A), that is, the base portion 1B side and the side to be connected with the other spiral pipe (A'), that is, the tip end projecting portion 1A side. Thus, [1] a variety is given to the thickness of the ring-like sealing bodies 15 and 16 bonded on the base portion 1B side, or to the thickness of the seal ring 6 fitted onto the outer circumference of the other spiral pipe (A'), or, not to say, [2] the spiral pipe (A) coupled with the joint 1 and the other spiral pipe (A') to be connected thereto need not have the same shape and size, and may have different shapes and different sizes. In such a case, they can be made to have different inner diameters suitable thereto. Moreover, it is possible to make such modification that the outer end portion on the base portion 1B side is shaped to be open in the form of a trumpet, or on the contrary the outer end portion on the tip end projecting portion 1A side is made simply cylindrical. On the other hand, in the spiral pipes (A) and (A'), the shape of the corrugation is not limited to only a trapezoid as shown in the embodiments, and may be modified to a generally known shape such as a semi-arc, a square or the like. In addition, the pipe wall may be single, double or multi-layered so long as its outer surface is spirally corrugated. In addition, the hardening liquid agent in the present invention is not limited to a so-called liquid one, and may be jelly one so long as injection can be carried out through a small hole. Further, although the agent is preferably a material having a property to foam and harden or expand in volume, any material may be used if it is easy to fill a space therewith.

Although the embodiments regarded as representatives of the present invention were described, the present invention is not limited to the structures of these embodiments. The present invention can be desirably modified and carried out within the scope where the above-mentioned constituent components are included, the objects of the present invention can be attained, and the following effects are obtained.

As is apparent from the above description, the joint according to the present invention has such a structure that the inner circumferential surface is made cylindrical and larger than the outer circumferential diameter of a peak portion of a spiral pipe to be connected, and near the center in its axial direction an annular projection is formed to project into the inner circumferential direction. A base portion on one side thereof is constituted by a first cylindrical portion, a spiral projection and a second cylindrical portion. Compressible and transformable ring-like sealing bodies are bonded on the inner surfaces of these first and second cylindrical portions, and a small hole for injecting a hardening liquid agent is formed in a portion between these sealing bodies so as to penetrate the portion. By such a structure of the joint, when this base portion is coupled onto a pipe end of the spiral pipe, it is possible to fit up to a predetermined deep portion easily while the spiral projection is engaged with the corrugation of the spiral pipe, and the both can be kept coaxial by the ring-like sealing bodies. By injecting a hardening liquid agent through the small hole and hardening the agent while such a coaxial state is kept, it is possible to obtain an effect to obtain water-tightness and prevention from relative movement in the axial direction easily and accurately.

As for a spiral pipe provided with a joint, it is possible to obtain a spiral pipe provided with a joint at its pipe end sequentially continuously, rapidly, accurately and uniformly by a skilled special worker, in a factory or the like, and independently of outside temperature, weather or the like, while keeping water-tightness and prevention from relative movement in the axial direction. In addition, the thus obtained spiral pipe can be always carried as that provided with a joint. Accordingly, there is an advantage that it is not necessary to carry a joint separately, and it is possible to connect a pipe end of another spiral pipe with a tip end projecting portion of the joint immediately, easily and rapidly. Thus, there is an advantage that it is possible to carry out the working of plumbing and connecting at a plumbing place rapidly.

Further, in the method of producing such a corrugated spiral pipe provided with a joint, since a joint having such a structure as mentioned above is used, it is possible to fit up to a predetermined fitting depth easily and accurately while the spiral projection of the joint is engaged with the corrugation of the spiral pipe by rotating the joint and the spiral pipe relatively, and the spiral pipe can be kept coaxial with the joint by the ring-like sealing bodies. By such a simple operation that a hardening liquid agent is injected through the small hole and kept, it is possible to obtain an effect to obtain a spiral pipe provided with a joint having watertightness and prevention from relative movement in the axial direction easily and accurately.

In addition, in the method of connecting another spiral pipe with such a spiral pipe provided with a joint at a plumbing place, after pressing a block-like water sealing material into a valley portion of a base end of the other spiral pipe to be connected, an elastic seal ring is fitted onto the outer circumferential surface of the water sealing material, and in this state the spiral pipe is pressed into the tip end projecting portion in the other spiral pipe provided with a joint. By only such a simple operation, there is a large effect that it is possible to perform the working of connection of pipes at a plumbing place extremely easily, rapidly and accurately, and it is possible to connect with a water tight state.

What is claimed is:

1. A corrugated spiral pipe joint for connecting a synthetic resin corrugated spiral pipe having an outer surface formed into a spirally corrugated shape, comprising:

an inner circumferential surface which is cylindrical and larger than an outer circumferential diameter of a peak portion of said spiral pipe to be connected;

an annular projection which is formed at a portion near a center in an axial direction of said joint so as to project into an inner circumferential direction;

a base portion which is located on one side of said annular projection and constituted by a first cylindrical portion, a spiral projection engageable with a spiral corrugation of said connected corrugated pipe, and a second cylindrical portion;

ring-like sealing bodies which are formed of compressible and transformable materials and bonded on said inner circumferential surface of said first and second cylindrical portions, respectively;

a small hole for injection of a hardening liquid agent, which is formed in a portion of said base portion between said sealing bodies so as to penetrate said base portion; and a tip end projecting portion located on the other side of said annular projection.

2. A corrugated spiral pipe provided with a joint, comprising:

a joint configured so as to include: an inner circumferential surface which is cylindrical and larger than an outer circumferential diameter of a peak portion of a corrugated spiral pipe to be coupled; an annular projection which is formed at a portion near a center in an axial direction of said joint so as to project into an inner circumferential direction; a base portion which is located on one side of said annular projection and constituted by a first cylindrical portion, a spiral projection engageable with a spiral corrugation of said connected corrugated pipe, and a second cylindrical portion; ring-like sealing bodies which are formed of compressible and transformable materials and bonded on the inner circumferential surface of said first and second cylindrical portions, respectively; a small hole for injection of a hardening liquid agent, which is formed in a portion of said base portion between said sealing bodies so as to penetrate said base portion; and a tip end projecting portion located on the other side of said annular projection;

said corrugated spiral pipe to be coupled, which is made of synthetic resin and which includes: an outer circumferential surface formed into a spirally corrugated shape; and a pipe end which is inserted into said base portion of said joint; and a hardened matter of said hardening liquid agent filled in a space portion which is surrounded by said outer circumferential surface of said pipe end, said inner circumferential surface of said base portion of said joint, and said ring-like sealing bodies, so that said joint is water-tightly coupled with said pipe end of said spiral pipe.

3. A method of producing a corrugated spiral pipe provided with a joint, comprising the steps of:

preparing a joint which includes: an inner circumferential surface which is cylindrical and larger than an outer circumferential diameter of a peak portion of a spiral pipe to be coupled; an annular projection which is formed at a portion near a center in an axial direction of said joint so as to project into an inner circumferential direction; a base portion which is located on one side of said annular projection and constituted by a first cylindrical portion, a spiral projection engageable with a spiral corrugation of said connected corrugated pipe, and a second cylindrical portion; ring-like sealing bodies which are formed of compressible and transformable materials and bonded on the inner circumferential surface of said first and second cylindrical portions, respectively; a small hole for injection of a hardening liquid agent, which is formed in a portion of said base portoion between said sealing bodies so as to penetrate said base portion; and a tip end projecting portion located on the other side of said annular projections;

inserting a pipe end of a synthetic resin corrugated spiral pipe having a spirally corrugated outer circumferential surface into said base portion of said joint while said spirally corrugated outer circumferential surface of said spiral pipe is engaged with said spiral projection of said joint; and injecting a hardening liquid agent through said small hole for injection of a hardening liquid agent into a space portion surrounded by an outer circumferential surface of said pipe end, said inner circumferential surface of said base portion of said joint, and said ring-like sealing bodies so that said space portion is filled with a hardened matter of said hardening liquid agent to thereby make said joint be water-tightly coupled with said pipe end of said spiral pipe.

4. A method of connecting a second corrugated spiral pipe to a first corrugated spiral pipe provided with a joint, comprising the steps of:

preparing said first corrugated spiral pipe provided with the joint which include: the joint including an inner circumferential surface which is cylindrical and larger than an outer circumferential diameter of a peak portion of a corrugated spiral pipe to be coupled; an annular projection which is formed at a portion near a center in an axial direction of said joint so as to project into an inner circumferential direction; a base portion which is located on one side of said annular projection and constituted by a first cylindrical portion, a spiral projection engageable with a spiral corrugation of said connected corrugated pipe, and a second cylindrical portion; ring-like sealing bodies which are formed of compressible and transformable materials and bonded on the inner circumferential surface of said first and second cylindrical portions, respectively; a small hole for injection of a hardening liquid agent, which is formed in a portion of said base portion between said sealing bodies so as to penetrate said base portion; and a tip end projecting portion located on the other side of said annular projection; said corrugated spiral pipe to be coupled, which is made of synthetic resin and which includes: an outer circumferential surface formed into a spirally corrugated shape; and a pipe end which is inserted into said base portion of said joint; and a hardened matter of said hardening liquid agent filled in a space portion which is surrounded by said outer circumferential surface of said pipe end, said inner circumferential surface of said base portion of said joint, and said ring-like sealing bodies, so that said joint is water-tightly coupled with said pipe end of said spiral pipe;

pressing a block-like water sealing material having a sectional shape a little larger than a sectional shape of a valley portion of a pipe end portion of said second corrugated spiral pipe to be connected into said valley portion (d);

fitting an elastic seal ring having an outer circumferential surface provided with a plurality of annular corrugations formed thereon onto an outer circumferential surface of said pipe end of said second spiral pipe so as to cover said block-like water sealing material; and pressing said pipe end into said tip end projecting portion of said joint.

5. A corrugated spiral pipe joint as claimed in claim 1, wherein said tip end projecting portion is a cylinder with an outer flared end portion.

6. A corrugated spiral pipe joint as claimed in claim 1, wherein said annular projection has a U-shaped section, and said spiral projection is formed of a plurality of partial projections divided in a circumferential direction.

7. A corrugated spiral pipe joint as claimed in claim 1, wherein said annular projection has a deformed V-shaped section, and said spiral projection is formed of a plurality of projections uncontinuous along a spiral direction.

8. A corrugated spiral pipe joint as claimed in claim 7, wherein said tip end projecting portion includes a spiral projection.

9. A corrugated spiral pipe provided with a joint as claimed in claim 2, wherein said tip end projecting portion is a cylinder with an outer flared end portion.

10. A corrugated spiral pipe provided with a joint as claimed in claim 2, wherein said annular projection has a U-shaped section, and said spiral projection is formed of a plurality of partial projections divided in a circumferential direction.

11. A corrugated spiral pipe provided with a joint as claimed in claim 2, wherein said annular projection has a deformed V-shaped section, and said spiral projection is formed of a plurality of projections uncontinuous along a spiral direction.

* * * * *